(12) United States Patent
Palin et al.

(10) Patent No.: US 10,979,219 B2
(45) Date of Patent: Apr. 13, 2021

(54) PAIRING OF DEVICES

(71) Applicant: Nokia Technologies Oy, Espoo (FI)

(72) Inventors: Arto Palin, Viila (FI); Jukka Reunamäki, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/120,558

(22) PCT Filed: Mar. 12, 2014

(86) PCT No.: PCT/FI2014/050179
§ 371 (c)(1),
(2) Date: Aug. 22, 2016

(87) PCT Pub. No.: WO2015/136142
PCT Pub. Date: Sep. 17, 2015

(65) Prior Publication Data
US 2017/0019935 A1  Jan. 19, 2017

(51) Int. Cl.
*G06F 21/44* (2013.01)
*H04L 9/08* (2006.01)
(Continued)

(52) U.S. Cl.
CPC .......... *H04L 9/0841* (2013.01); *G06F 21/445* (2013.01); *H04L 9/3263* (2013.01);
(Continued)

(58) Field of Classification Search
CPC .. H04L 9/0841; H04L 63/0884; G06F 21/445
(Continued)

(56) References Cited

U.S. PATENT DOCUMENTS 6,484,257 B1 * 11/2002 Ellis .................... H04L 63/0272
380/279
6,766,453 B1 * 7/2004 Nessett ................. H04L 9/0844
455/410
(Continued)

FOREIGN PATENT DOCUMENTS

CN         1674512 A     9/2005
CN         1729645 A     2/2006
(Continued)

OTHER PUBLICATIONS

Malkani et al., "A Generic Framework for Device Pairing in Ubiquitous Computing Environments", International Journal of Network Security & Its Applications, vol. 4, No. 2, Mar. 2012, pp. 1-20.
(Continued)

*Primary Examiner* — David J Pearson
(74) *Attorney, Agent, or Firm* — Mintz Levin Cohn Ferris Glovsky and Popeo, P.C.

(57) ABSTRACT

According to an example embodiment of the present invention, there is provided an apparatus comprising at least one processing core configured to determine a pairing opportunity with a second apparatus and to cause a message to be transmitted to a server, the message comprising a generated number, a receiver configured to receive from the server an indication, and the at least one processing core being further configured to, at least in part based on the indication, cause the apparatus to participate in pairing with the second apparatus.

19 Claims, 6 Drawing Sheets

(51) Int. Cl.
| | |
|---|---|
| *H04L 29/06* | (2006.01) |
| *H04L 9/32* | (2006.01) |
| *H04L 29/08* | (2006.01) |
| *H04W 12/00* | (2021.01) |
| *H04W 12/04* | (2021.01) |
| *H04W 84/18* | (2009.01) |

(52) U.S. Cl.
 CPC .............. *H04L 29/06* (2013.01); *H04L 29/08* (2013.01); *H04L 63/062* (2013.01); *H04L 63/0884* (2013.01); *H04W 12/003* (2019.01); *H04W 12/04* (2013.01); *H04L 63/0823* (2013.01); *H04W 84/18* (2013.01)

(58) Field of Classification Search
 USPC ................... 713/171, 168, 170, 176; 380/270
 See application file for complete search history.

(56) References Cited

U.S. PATENT DOCUMENTS

| | | | |
|---|---|---|---|
| 2004/0034776 A1* | 2/2004 | Fernando | H04L 9/0825 713/171 |
| 2004/0083368 A1 | 4/2004 | Gehrmann | |
| 2005/0223230 A1* | 10/2005 | Zick | H04L 9/0841 713/171 |
| 2006/0173974 A1* | 8/2006 | Tang | H04L 63/029 709/217 |
| 2007/0123166 A1* | 5/2007 | Sheynman | H04M 1/7253 455/41.2 |
| 2008/0065892 A1 | 3/2008 | Bailey | |
| 2008/0090612 A1* | 4/2008 | Glinka | H04W 12/0401 455/557 |
| 2009/0158039 A1* | 6/2009 | Prasad | H04L 9/0844 713/168 |
| 2009/0287922 A1* | 11/2009 | Herwono | H04L 9/0822 713/155 |
| 2009/0327724 A1* | 12/2009 | Shah | H04L 9/3271 713/169 |
| 2010/0049975 A1* | 2/2010 | Parno | H04L 63/08 713/168 |
| 2010/0058064 A1* | 3/2010 | Kirovski | H04L 9/3073 713/176 |
| 2011/0119491 A1* | 5/2011 | Nocera | H04L 9/3226 713/170 |
| 2011/0167262 A1* | 7/2011 | Ross | H04W 12/06 713/168 |
| 2011/0217950 A1* | 9/2011 | Kozlay | H04W 12/04 455/410 |
| 2011/0273625 A1* | 11/2011 | McMahon | G06F 21/445 348/734 |
| 2011/0320535 A1 | 12/2011 | Donaldson | |
| 2012/0019379 A1 | 1/2012 | Ben Ayed | |
| 2012/0054493 A1 | 3/2012 | Bradley | |
| 2012/0083208 A1 | 4/2012 | Giles et al. | |
| 2013/0169571 A1 | 7/2013 | Gai et al. | |
| 2013/0253967 A1 | 9/2013 | Single | |
| 2014/0079217 A1* | 3/2014 | Bai | H04L 63/0869 380/270 |
| 2014/0235168 A1* | 8/2014 | Molettiere | H04B 7/26 455/41.2 |
| 2014/0273845 A1* | 9/2014 | Russell | H04W 8/005 455/41.2 |
| 2015/0089222 A1* | 3/2015 | White | H04L 63/0428 713/168 |
| 2015/0189006 A1* | 7/2015 | Smus | H04L 67/104 709/204 |
| 2016/0234214 A1* | 8/2016 | Sethi | H04W 12/06 |

FOREIGN PATENT DOCUMENTS

| | | |
|---|---|---|
| CN | 101207867 A | 6/2008 |
| CN | 102791014 A | 11/2012 |
| CN | 102868593 A | 1/2013 |
| CN | 103078953 A | 5/2013 |
| CN | 103078953 A | 5/2013 |
| CN | 103458025 A | 12/2013 |
| CN | 102971986 | 3/2014 |
| EP | 1865656 A1 | 12/2007 |
| EP | 1865656 A1 | 12/2007 |
| EP | 2395446 A1 | 12/2011 |
| EP | 2395446 A1 | 12/2011 |
| JP | 2012-105100 A | 5/2012 |
| WO | 2011113874 A2 | 9/2011 |
| WO | 2012033107 A1 | 3/2012 |
| WO | WO-2012157196 | 11/2012 |
| WO | 2013109370 A2 | 7/2013 |

OTHER PUBLICATIONS

"Bluetooth Core Specification version 2.0 + EDR", Bluetooth, Nov. 4, 2004, 1230 pages.

Malkani et al., "A Framework for Secure Device Pairing by Demonstration of Physical Proximity", Proceedings of the 8th International Conference on Frontiers of Information Technology, Dec. 21-23, 2010, 6 pages.

Extended European Search Report received for corresponding European Patent Application No. 14885285.8, dated Aug. 7, 2017, 6 pages.

International Search Report and Written Opinion received for corresponding Patent Cooperation Treaty Application No. PCT/FI2014/050179, dated Nov. 21, 2014, 15 pages.

\* cited by examiner

PAIRING OF DEVICES

RELATED APPLICATION

This application was originally filed as Patent Cooperation Treaty Application No. PCT/FI2014/050179 filed Mar. 12, 2014.

FIELD OF INVENTION

The present invention relates to pairing devices, such as for example wireless consumer devices.

BACKGROUND OF INVENTION

Users may possess more than one electronic device. Where a user is in possession of, for example, a music player and headphones, the user may plug the headphones into the music player, to thereby enable listening to music from the music player via the headphones. Likewise video playback devices, such as DVD players, may be connected with televisions and speakers with suitable cabling. The devices may be configured to detect presence of live cabling in their connectors, whereby a user may define pairings between his devices by connecting the cables.

Where devices are configured to communicate wirelessly, pairings may not be definable using cabling. In these cases, a user may pair devices with each other using one of several different processes. For example, the user may configure both devices to activate their wireless interfaces to detect compatible wireless-enabled devices within communication range. Subsequently, the user may select from a list displayed by a first device a second, detected, device that he wants to pair with the first device.

A pairing of the first device and the second device may proceed after the user selection. For example, a wireless protocol connection may be initiated between the first device and the second device in accordance with a specific wireless communication protocol that both the first device and the second device are configured to support. To verify the connection is between the correct devices, one of the devices may display a numeric code that the user then inputs to the other device or other device may show the same code based on pairing so that user just compares that devices show the same number. Thereby, the user may be confident that the wireless protocol connection, which unlike a cable he cannot see, is indeed between the first device and the second device, and does not involve a third nearby device which may be owned by a second user.

In case a pairing occurs accidentally between incorrect devices, privacy may be compromised in case another user gains, at least in part, access to data of the user. Alternatively, the devices may simply not work as intended. For example, where the user wants to listen to music using a wireless headset, he will not hear anything from his headset in case his music player is incorrectly paired with an incorrect headset and not the intended headset.

Wireless interfaces usable in pairing devices, such as for example user devices, include the Bluetooth standard in its various versions, wireless local area network, WLAN, also known as Wi-Fi, and other suitable wireless communication protocols.

SUMMARY OF THE INVENTION

According to a first aspect of the present invention, there is provided an apparatus comprising at least one processing core configured to determine a pairing opportunity with a second apparatus and to cause a message to be transmitted to a server, the message comprising a generated number, a receiver configured to receive from the server an indication, and the least one processing core being further configured to, at least in part based on the indication, cause the apparatus to participate in pairing with the second apparatus.

Various embodiments of the first aspect may comprise at least one feature from the following bulleted list:

- the generated number comprises a number generated in the apparatus in response to the determining of the pairing opportunity
- the number is generated at least in part based on a cryptographic exchange with the second apparatus
- the pairing comprises a secure pairing in accordance with Bluetooth version 2.1 or newer
- the message is caused to be transmitted to the server via a tunnel via the second apparatus
- the tunnel is based at least in part on at least one of a cryptographic certificate of the server, a cryptographic certificate of the apparatus and a diffie-hellman key exchange
- the apparatus is further configured to receive a public key of the second apparatus
- the at least one processing core is further configured to derive an encryption key from the public key of the second apparatus and a private key of the apparatus, and to cause the apparatus to participate in the pairing based at least in part on the derived encryption key
- the derived encryption key comprises a diffie-hellman key
- the message comprises an identifier of the second apparatus
- the at least one processing core is further configured to determine whether communication with the server is feasible, and responsive to communication with the server being determined to not be feasible, the at least one processing core is configured to cause the apparatus to display the generated number, or a string derived from the generated number.

According to a second aspect of the present invention, there is provided a method comprising determining a pairing opportunity with a second apparatus and causing a message to be transmitted to a server, the message comprising a generated number, receiving from the server an indication, and at least in part based on the indication, causing an apparatus to participate in pairing with the second apparatus.

Various embodiments of the second aspect may comprise at least one feature corresponding to a feature from the preceding bulleted list laid out in connection with the first aspect.

According to a third aspect of the present invention, there is provided an apparatus comprising at least one processing core, at least one memory including computer program code, the at least one memory and the computer program code being configured to, with the at least one processing core, cause the apparatus at least to receive a first message originating from a first apparatus and a second message originating from a second apparatus, compare a first number in the first message to a second number in the second message, and determine, based at least in part on the first and second messages, whether the first and second numbers are the same number, and indicate to the first and second apparatuses whether pairing is appropriate.

According to a fourth aspect of the present invention, there is provided a method comprising receiving a first message originating from a first apparatus and a second message originating from a second apparatus, comparing a first number in the first message to a second number in the second message, and determining, based at least in part on the first and second messages, whether the first and second numbers are the same number, and indicating to the first and second apparatuses whether pairing is appropriate.

According to a fourth aspect of the present invention, there is provided an apparatus comprising means for determining a pairing opportunity with a second apparatus and for causing a message to be transmitted to a server, the message comprising a generated number, means for receiving from the server an indication, and means for, at least in part based on the indication, causing the apparatus to participate in pairing with the second apparatus.

According to a fourth aspect of the present invention, there is provided an apparatus comprising means for receiving a first message originating from a first apparatus and a second message originating from a second apparatus, means for comparing a first number in the first message to a second number in the second message, and means for determining, based at least in part on the first and second messages, whether the first and second numbers are the same number, and means for indicating to the first and second apparatuses whether pairing is appropriate.

According to a fifth aspect of the present invention, there is provided a non-transitory computer readable medium having stored thereon a set of computer readable instructions that, when executed by at least one processor, cause an apparatus to at least determine a pairing opportunity with a second apparatus and cause a message to be transmitted to a server, the message comprising a generated number, receive from the server an indication, and cause, at least in part based on the indication, the apparatus to participate in pairing with the second apparatus According to a sixth aspect of the present invention, there is provided a non-transitory computer readable medium having stored thereon a set of computer readable instructions that, when executed by at least one processor, cause an apparatus to at least receive a first message originating from a first apparatus and a second message originating from a second apparatus, compare a first number in the first message to a second number in the second message, and determine, based at least in part on the first and second messages, whether the first and second apparatuses are the same number, and indicate to the first and second apparatuses whether pairing is appropriate

INDUSTRIAL APPLICABILITY

At least some embodiments of the present invention find industrial applicability in facilitating secure pairing of devices, whereby data security and/or usability may be enhanced.

DETAILED DESCRIPTION OF EXAMPLE EMBODIMENTS

When pairing devices pertaining to a same user account, a user interaction phase may be eliminated to yield an automatic and secure pairing method by utilizing a server disposed in a network. In detail, a numeric comparison phase involving a user may be replaced by a comparison phase performed in a server to verify that devices considering pairing are devices of one and the same user.

Figure 1:
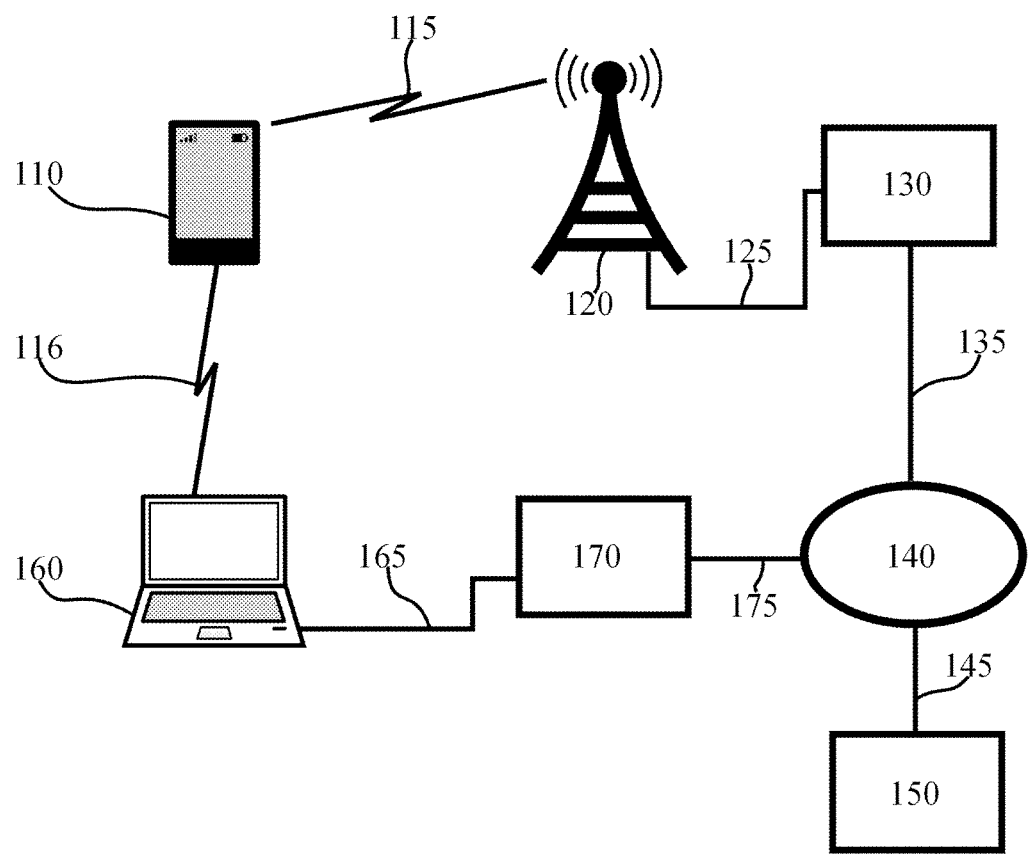
FIG. 1 illustrates a first example system in accordance with at least some embodiments of the present invention.

FIG. 1 illustrates a first example system in accordance with at least some embodiments of the present invention. Illustrated is base station 120, which may comprise a cellular or non-cellular base station. A non-cellular base station may be referred to as an access point, but the term base station is used hereinafter for the sake of clarity. Base station 120 may be arranged to operate in accordance with a cellular communication standard, such as for example wideband code division multiple access, WCDMA, or long term evolution, LTE. Base station 120 may be arranged to operate in accordance with a non-cellular communication standard, such as for example wireless local area network, WLAN, also known as Wi-Fi, or worldwide interoperability for microwave access, WiMAX. Base station 120 may be configured to establish wireless links with mobile devices in accordance with any standard or standards base station 120 is arranged to operate in accordance with.

Base station 120 may be configured to control at least one cell. Base station 120 may be configured to control more than one cell, each of the cells being characterized by a cell coverage area. Overlapping cell coverage areas are possible, for example, in case the cells operate at different operating frequencies. Base station 120 may receive mobile units into cells it controls via handover procedures, in case the mobile units move into a cell coverage area of a cell controlled by base station 120.

Base station 120 may be operably connected, via connection 125, to network node 130. Network node 130 may comprise, for example, a base station controller, radio network controller, mobility management entity or other node. Network node 130 may in turn be operably connected, via connection 135, to network 140. Network 140 may comprise, or be connected to, the Internet, for example.

FIG. 1 illustrates also device 160, which may comprise, for example, a laptop computer, a tablet computer, a desktop computer, a smartphone, a gaming device, a media playback device or a media recording device. Device 160 is in communication with gateway 170 via connection 165. Gateway 170 may be configured to provide for device 160 connectivity to network 140, which as noted above may comprise, for example, the Internet.

Connected to network 140, or alternatively disposed in network 140, is server 150. Server 150 may be configured with, or provided access to, information relating to pairing devices over a wireless connection. The connection between network 140 and server 150 is illustrated with reference numeral 145. In embodiments where server 150 is disposed in network 140, connection 145 may be absent, or seen as a connection internal to network 140.

Connections 125, 135, 145, 165 and 175 may each be wire-line connections, or at least in part wireless. Each of connections 125, 135, 145, 165 and 175 need not be of the same type.

FIG. 1 illustrates also mobile 110, which may comprise, for example, a cellular telephone, smartphone, tablet device, phablet device, laptop computer or other electronic device with wired or wireless communication capability. In the illustrated example, mobile 110 has wireless link 115 with base station 120. Wireless link 115 may operate in accordance with a wireless standard that both mobile 110 and base station 120 are configured to support. Wireless link 115 may comprise an uplink for conveying information from mobile 110 to base station 120. Wireless link 115 may comprise a downlink for conveying information from base station 120 to mobile 110. Wireless link 115 may be arranged to operate in accordance with cellular principles such as time division multiple access TDMA, code division multiple access, CDMA, or WLAN principles, for example. Mobile 110 may be configured to seek attachment to a cell controlled by base station 120 when disposed inside a cell coverage area of such a cell. Although illustrated in FIG. 1 as connected via wireless link 115, in some embodiments of the invention mobile 110 has a wire-line connection to network 140.

Mobile 110 and device 160 may detect each other using a wireless technology supporting pairing, such as for example a proximity or short-range technology, such as for example Bluetooth, NFC or WLAN. To initiate pairing of the devices without user intervention, or with reduced user intervention, mobile 110 and device 160 may be configured to communicate with server 150 to verify each other as appropriate for pairing.

Responsive to detecting the presence of device 160 within communication range of a wireless communication technology that supports pairing devices, and responsive to a determination device 160 supports the same wireless communication technology, mobile 110 may be configured to compile a message for server 150, and to send the message toward server 150. The message may comprise an indication of a user account associated with mobile 110. Where the pairing is conducted in accordance with a protocol supporting numeric comparison, mobile 110 may be configured to include in the message a number for comparison. Mobile 110 may be configured to transmit the message toward server 150 via base station 120, or in general via any active interface mobile 110 has that provides connectivity toward server 150.

An exponential key exchange, which is one form of a Diffie-Hellman key exchange, is a method of digital encryption that uses numbers raised to specific powers to a shared secret on the basis of components that are never directly transmitted, making the task of a would-be code breaker mathematically difficult. Different variants of diffie-hellman exchanges exist, for example in some embodiments elliptic curves may be employed instead of or in addition to specific powers. In some embodiments, an encryption key is derived from a shared secret established with a diffie-hellman exchange, for example by employing a hash function with the shared secret.

The number for comparison may be derived in mobile 110 using a diffie-hellman exchange with device 160 which is conducted in connection with initiation of the pairing process, for example. Mobile 110 and device 160 may exchange at least one nonce over the air interface interconnecting them, and both mobile 110 and device 160 may compute their own copies of the number using the at least one nonce and information from the diffie-hellman exchange. This way, mobile 110 and device 160 may derive the same number without the number, or information allowing the number to be determined, being communicated over the air interface. In some embodiments, a pre-agreed section of the pairing initiation procedure is used as the nonce, instead of a specifically generated random value. In this sense, the number for comparison may comprise either a shared secret established with a diffie-hellman exchange, or the number may comprise a number derived from such a shared secret using a pre-agreed procedure. In general mobile 110 and device 160 may undergo a cryptographic exchange, of which diffie-hellman and diffie-hellman-like exchanges are examples. A cryptographic exchange in general enables generating a shared secret in mobile 110 and device 160 without communicating the shared secret, or information allowing the shared secret to be derived, over wireless link 116.

By deriving the number for comparison in each device separately without communicating it over the air interface, man-in-the-middle type attacks may be defended against since an attacker eavesdropping wireless link 116 interconnecting mobile 110 and device 160 cannot derive the number.

Device 160 may likewise be configured to compile and send a message to server 150, the message comprising, like that sent by mobile 110, at least one of the number for comparison and the indication of a user account. Additionally or alternatively device 160 and/or mobile 110 may be configured to provide information regarding pairing-capable devices, such as a Bluetooth address of itself and/or an intended pairing device. In the message sent by device 160, the indication of user account would refer to a user account associated with device 160.

Server 150, being in receipt of both the message from mobile 110 and the message from device 160, may compare the numbers comprised in the respective messages. In case the numbers match, in other words where the numbers are the same, server 150 may indicate to mobile 110 and to device 160 that pairing is appropriate. This is the case since in case the devices manage to derive the same number, wireless link 116 is likely secure and not eavesdropped on. As discussed herein, the term number is used to denote a variable or string for comparison. In general, a number may comprise a decimal number, a binary number, a hexadecimal number, string of characters or other kind of string representation of an underlying number, which electronic devices may process as a binary number, for example. Where the generated number is displayed, or caused to be displayed, it may be presented in a different format than when transmitted in a message. For example, the number may be transmitted in a message as a binary number, but presented on a display as a hexadecimal number or as a string, such as for example character string or numerical string, derived from the number.

In some embodiments, server 150 may additionally or alternatively verify that an indication of user account comprised in the message from mobile 110 and the message from device 150 relates to a same user account. In this case, in case they relate to the same user account, server 150 may be configured to indicate pairing as appropriate. In case they relate to different user accounts, server 150 may be configured to indicate pairing as inappropriate, or at least refrain from indicating pairing as appropriate. In some embodiments, server 150 is configured to verify that mobile 110 and/or device 160 is configured in user account or subscription information as enabled or allowed to engage in pairing.

Server 150 may be configured to wait, after receiving a first message from one of mobile 110 and device 160, for a predetermined time for the other message to arrive. In case the other message does not arrive during the predetermined wait period, server 150 may either discard the first message or reply to the sender of the first message that an error occurred.

If mobile 110, for example, sends a message comprising a number for comparison to server 150 and fails to receive a response, or receives an error message in response, mobile 110 may be configured to display the number for comparison on a display comprised in mobile 110. In this case, if device 160 also displays the number for comparison, the user may personally check that both devices are displaying the same number, and accept, using user interfaces of mobile 110 and device 160, the pairing in case the numbers match.

Mobile 110 may form a secured communication channel to server 150 for transmitting the message. For example, where mobile 110 possesses a public key of server 150, mobile 110 may encrypt at least part of the message using the public key of server 150 before sending it. For example, in some embodiments only the number for comparison is encrypted. In some embodiments, mobile 110 includes its own public key in the message encrypted with the public key of server 150, so server 150 may reply in encrypted form, using the public key of mobile 110 to perform the encryption of the response before sending it from server 150 toward mobile 110. Another possible way to form a secured communication channel to server 150 is to perform a diffie-hellman key exchange between mobile 110 and server 150 to establish a shared secret, which may then be used as a symmetric encryption key, or as basis for a symmetric encryption key, used to secure the communication channel between mobile 110 and server 150.

In addition to or alternatively to techniques above, mobile 110 may employ transport layer security, TLS, or in general cryptographic certificates, signatures and/or a hash function to ensure the message from mobile 110 to server 150, and the response from server 150 to mobile 110, are communicated securely. Device 160 may likewise form a secured communication channel from device 160 to server 150.

Responsive to receiving from server 150 a message indicating pairing with device 160 is appropriate, mobile 110 may participate in completing a pairing with device 160. Responsive to receiving from server 150 a message indicating pairing with mobile 110 is appropriate, device 160 may participate in completing a pairing with mobile 110.

In some embodiments, mobile 110 may determine, for example from a service discovery protocol, SDP, message from device 160 whether device 160 supports server-aided connection setup. Responsive to a determination that device 160 does not support server-aided connection setup, mobile 110 may be configured to display, or cause to be displayed, the number for comparison or a string derived from the number for comparison. Additionally or alternatively, mobile 110 may be configured to cause the displaying in case mobile 110 determines that it cannot send the message to server 150.

Figure 2:
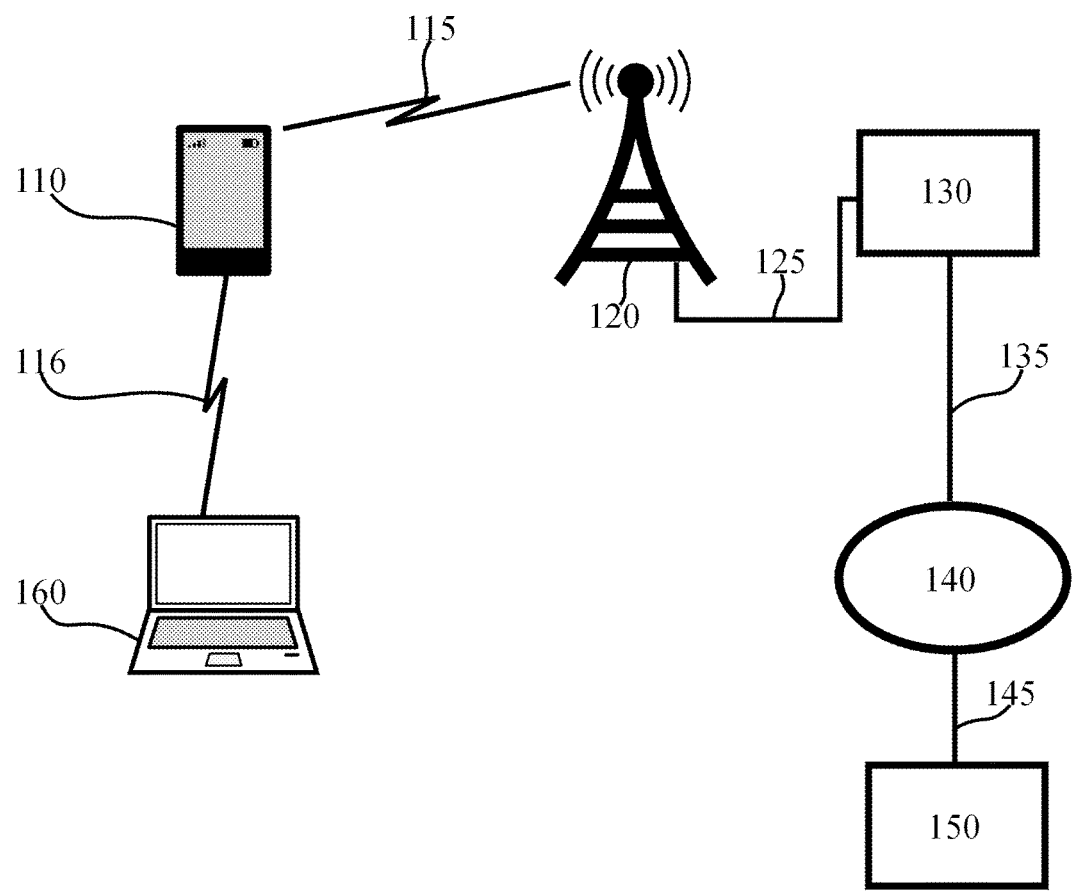
FIG. 2 illustrates a second example system in accordance with at least some embodiments of the present invention.

FIG. 2 illustrates a second example system in accordance with at least some embodiments of the present invention. The second example system of FIG. 2 resembles the first example system of FIG. 1, except in that device 160 doesn't have a connection to network 140 and/or server 150 independently of mobile 110.

In the embodiments of FIG. 2, device 160 may transmit the message comprising the number for comparison to server 150 via mobile 110. This may occur via the same wireless communication technology as is used for the pairing, or via a different wireless communication technology that mobile 110 and device 160 both support.

To ensure mobile 110 or another node cannot intercept or modify the messaging between device 160 and server 150, device 160 may, as in the embodiment of FIG. 1, be configured to form a secured communication channel between itself and server 150. A secured communication channel may be referred to as a tunnel.

In general, pairing-enabled devices may be configured with information concerning server 150 to enable the messaging described above to automate assessment whether pairing is appropriate. Such information concerning server 150 may comprise, for example, an internet protocol, IP, address of server 150, a domain name of server 150 that mobile 110 and/or device 160 may use to dynamically obtain an IP address of server 150 from a domain name system, DNS, and/or a public key of server 150. Mobile 110 and device 160 may additionally or alternatively be furnished with a cryptographic certificate of an entity that has signed a certificate of server 150, to enable forming a secure connection to server 150.

Figure 3:
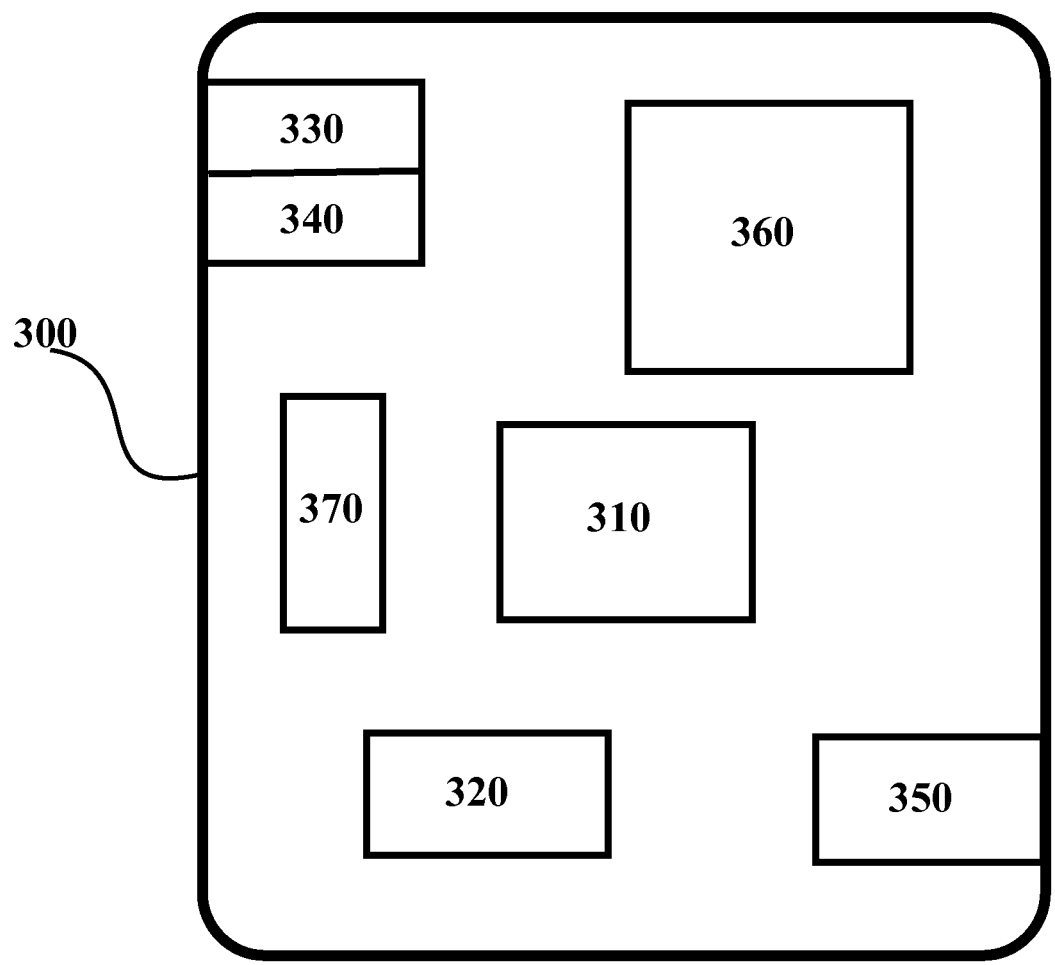
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a mobile communication device such as mobile 110 or device 160 of FIG. 1 or FIG. 2. Comprised in device 300 is processor 310, which may comprise, for example, a single- or multi-core processor wherein a single-core processor comprises one processing core and a multi-core processor comprises more than one processing core. Processor 310 may comprise a Qualcomm Snapdragon 800 processor, for example. Processor 310 may comprise more than one processor. A processing core may comprise, for example, a Cortex-A8 processing core manufactured by Intel Corporation or a Brisbane processing core produced by Advanced Micro Devices Corporation. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise magnetic, optical and/or holographic memory, for example. Memory 320 may be at least in part accessible to processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and receiver 340 may be comprised in a unit known as a transceiver, which may be a single physical unit or may be distributed as more than one physical unit. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Device 300 may comprise a short range communication, transceiver 350. Short Range transceiver 350 may support at least one short range technology, such as NFC, Bluetooth, WLAN or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via short range transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further components not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a short range transceiver 350 and/or user identity module 370.

Processor 310, memory 320, transmitter 330, receiver 340, short range transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
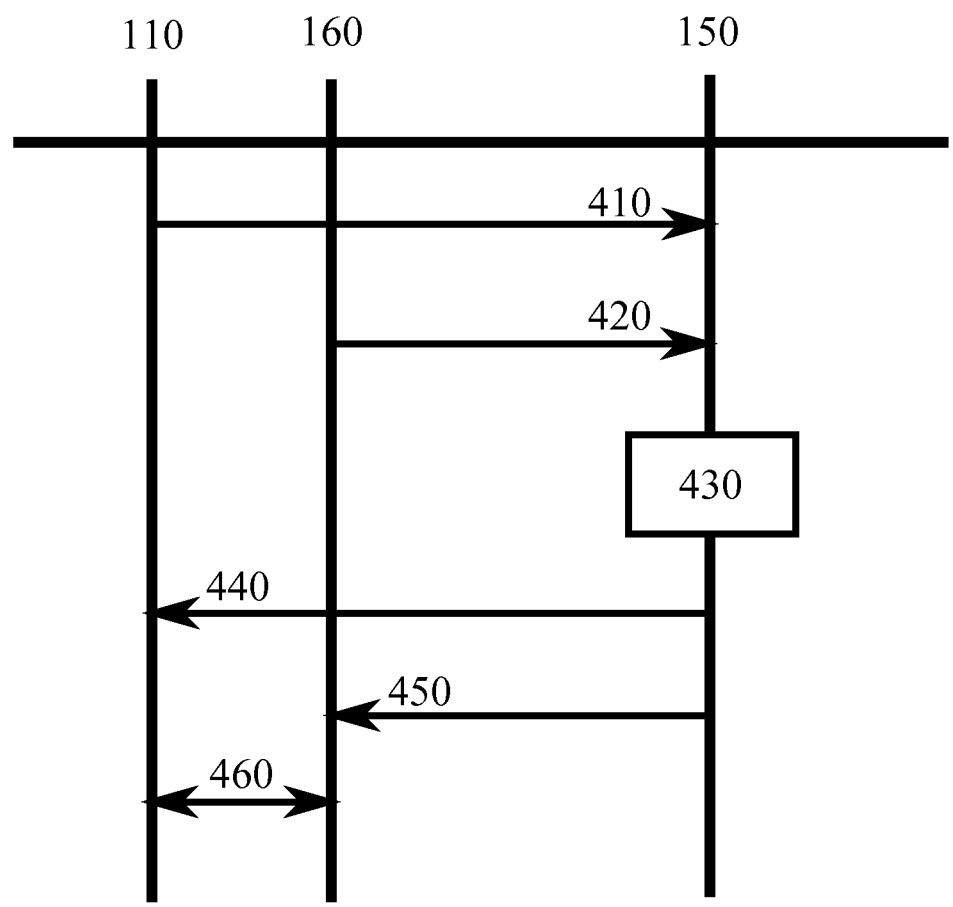
FIG. 4 is a signalling diagram of at least one embodiment of the present invention.

FIG. 4 is a signalling diagram of at least one embodiment of the present invention. On the vertical axes are, from left to right, mobile 110, device 160, and finally server 150.

In phase 410, mobile 110 transmits to server 150 a message comprising a generated number as described above. Phase 410 may occur at least in part responsive to determining, in mobile 110, a pairing opportunity with device 160. The generated number of phase 410 may be generated in mobile 110 based at least in part on a diffie-hellman or diffie-hellman-like exchange with device 160.

In phase 420, device 160 transmits to server 150 a message comprising a generated number as described above. The generated number of phase 420 may be generated in device 160 based at least in part on a diffie-hellman or diffie-hellman-like exchange with mobile 110.

In phase 430, server 150 may compare the generated numbers received in server 150 in phases 410 and 420. In case the generated numbers match, server 150 may indicate the match to mobile 110 in a message illustrated in FIG. 4 as phase 440, and to device 160 in a message illustrated in FIG. 4 as phase 450.

Responsive to receipt of the messages of phases 440 and 450, mobile 110 and device 160 may complete their pairing, which is illustrated as phase 460.

Figure 5:
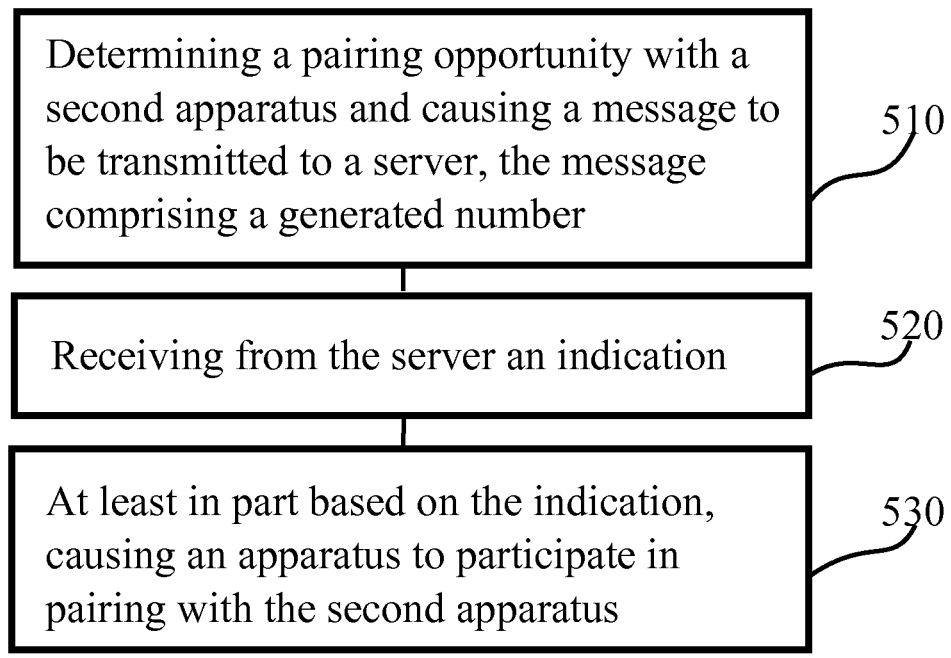
FIG. 5 is a flow graph of a first method in accordance with at least some embodiments of the present invention.

FIG. 5 is a flow graph of a first method in accordance with at least some embodiments of the present invention. The phases of the illustrated method may be performed in an apparatus such as mobile 110 or device 160, or in a control device for implantation in mobile 110 or device 160, to control the functioning thereof, for example. Phase 510 comprises determining a pairing opportunity with a second apparatus and causing a message to be transmitted to a server, the message comprising a generated number. Phase 520 comprises receiving from the server an indication. Finally, phase 530 comprises at least in part based on the indication, causing the apparatus to participate in pairing with the second apparatus. Phase 530 may comprise causing the apparatus to participate in completing a pairing initiated in phase 510.

Figure 6:
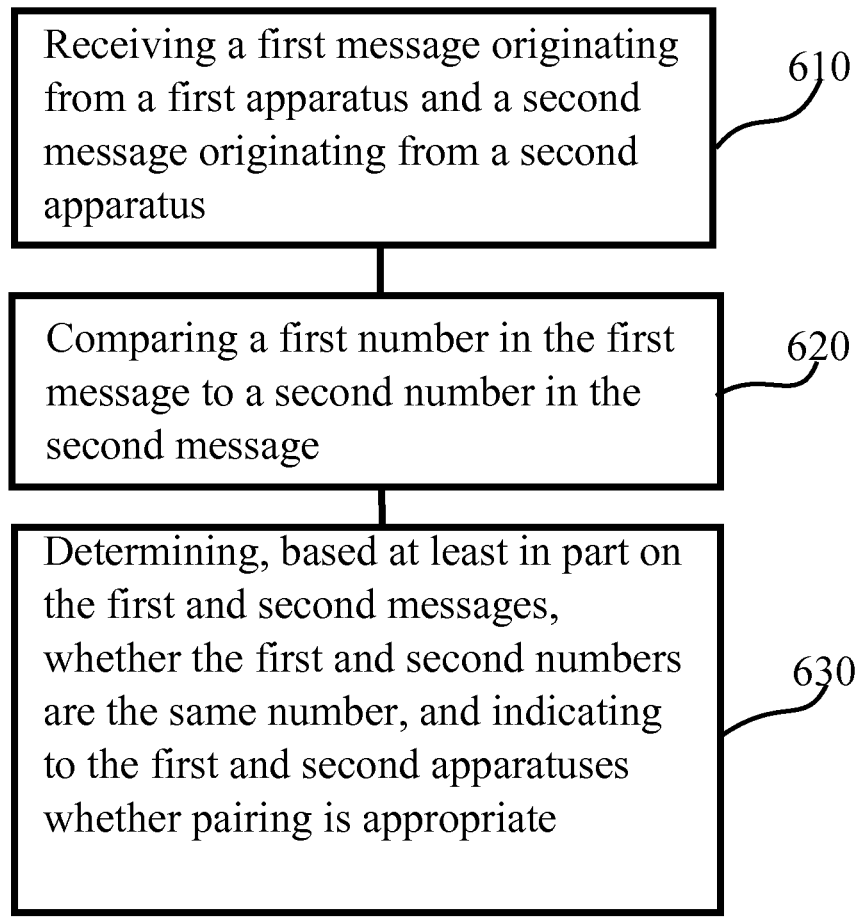
FIG. 6 is a flow graph of a second method in accordance with at least some embodiments of the present invention.

FIG. 6 is a flow graph of a second method in accordance with at least some embodiments of the present invention. The phases of the illustrated method may be performed in server 150, for example. Phase 610 comprises receiving a first message originating from a first apparatus and a second message originating from a second apparatus. Phase 620 comprises comparing a first number in the first message to a second number in the second message. Finally, phase 630 comprises determining, based at least in part on the first and second messages, whether the first and second numbers are the same number, and indicating to the first and second apparatuses whether pairing is appropriate. In some embodiments, phase 630 also comprises determining whether the first and second apparatuses are associated with the same user account. Determining whether the first and second apparatuses are associated with the same user account may comprise comparing information on MAC address and/or device identification provided in the first and second messages, for example.

In general there is provided a first apparatus, such as for example mobile 110 or device 160 of FIG. 1 or FIG. 2, or a control device for implantation in mobile 110 or device 160, to control the functioning thereof. An example of a control apparatus is a processor or chipset. The first apparatus comprises at least one processing core configured to determine a pairing opportunity with a second apparatus and to cause a message to be transmitted to a server, the message comprising a generated number. The determination of pairing opportunity may comprise, for example, a measurement that there is within communication range of a pairing-suitable wireless communication technology the second apparatus that also supports the pairing-suitable wireless communication technology. The number may be generated at least in part based on a cryptographic exchange, such as for example a diffie-hellman exchange, as described above. The number may be generated at least in part in response to the determining of the pairing opportunity.

The first apparatus further comprises a receiver configured to receive from the server an indication, and the least one processing core is further configured to, at least in part based on the indication, cause the apparatus to participate in pairing with the second apparatus. The indication may indicate that pairing with the second apparatus is appropriate. The indication may comprise an identifier of the second apparatus. At least one of the message and the indication may be conveyed between the apparatus and the server using a secured communication channel. Where the first apparatus comprises a control apparatus, the receiver may be comprised in the control apparatus, such as for example in a processor or chipset.

The opportunity for pairing may comprise an opportunity for a Bluetooth 2.1 or newer secure pairing. In some embodiments, the message is caused to be transmitted toward the server via the second apparatus, using a secured communication channel, also known as a secure tunnel. A secure tunnel may be based at least in part on at least one of a cryptographic certificate of the server, a cryptographic certificate of the apparatus and a diffie-hellman key exchange. The secure tunnel may comprise a TLS connection.

The message sent toward the server may comprise an identifier of the own apparatus and/or of the second apparatus, such as for example a medium access control, MAC, address of the second apparatus. Alternatively, the identifier of the second apparatus may comprise an IP address, such as an IPv6 address, of the second apparatus.

Communication being not feasible may comprise, for example, that pairing information is not received from the server, or that no communication interface is available that is capable of conveying information to the server.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An apparatus comprising:
at least one processing core and at least one memory including program code which when executed by the at least one processing core causes the apparatus to at least:
determine a pairing opportunity with a second apparatus via a short-range wireless communication link, wherein the apparatus and the second apparatus are associated with a same user;
transmit a message to a server, wherein the message comprises a generated number and an indication of the same user; and
determine whether communication with the server is feasible, and responsive to communication with the server not being feasible, display the generated number, or a string derived from the generated number.

2. The apparatus according to claim 1, wherein the generated number comprises a number generated in the apparatus in response to the determining of the pairing opportunity.

3. The apparatus according to claim 2, wherein the generated number is generated at least in part based on a cryptographic exchange with the second apparatus.

4. The apparatus according to claim 1, wherein the pairing comprises a secure pairing, wherein the short-range wireless communication link is in accordance with at least Bluetooth version 2.1.

5. The apparatus according to claim 1, wherein the message is caused to be transmitted to the server via a tunnel via a cellular network and the second apparatus.

6. The apparatus according to claim 5, wherein the tunnel is based at least in part on at least one of a cryptographic certificate of the server, a cryptographic certificate of the apparatus, and a diffie-hellman key exchange.

7. The apparatus according to claim 1, wherein the apparatus is further caused to receive a public key of the second apparatus.

8. The apparatus according to claim 7, wherein the apparatus is further caused to derive an encryption key from the public key of the second apparatus and a private key of the apparatus, and to cause the apparatus to participate in the pairing based at least in part on the derived encryption key.

9. The apparatus according to claim 8, wherein the derived encryption key comprises a diffie-hellman key.

10. The apparatus according to claim 1, wherein the message further comprises an identifier of the second apparatus.

11. The apparatus of claim 1, wherein the indication of the same user comprises an internet protocol address of the apparatus, a medium access control address of the apparatus and/or of the second apparatus.

12. A method comprising:
determining a pairing opportunity between a first apparatus and a second apparatus via a short-range wireless communication link, wherein the first apparatus and the second apparatus are associated with a same user;
causing the first apparatus to transmit a message to a server, wherein the message comprises a generated number and an indication of the same user; and
determining whether communication with the server is feasible, and responsive to communication with the server not being feasible, causing display of the generated number, or a string derived from the generated number.

13. The method according to claim 12, wherein the generated number comprises a number generated in the first apparatus in response to the determining of the pairing opportunity.

14. The method according to claim 13, wherein the generated number is generated at least in part based on a cryptographic exchange with the second apparatus.

15. The method according to claim 12, wherein the pairing comprises a secure pairing, wherein the short-range wireless communication link is in accordance with at least Bluetooth version 2.1.

16. The method according to claim 12, wherein the message is caused to be transmitted to the server via a tunnel via a cellular network and the second apparatus.

17. The method according to claim 16, wherein the tunnel is based at least in part on at least one of a cryptographic certificate of the server, a cryptographic certificate of the apparatus, and a diffie-hellman key exchange.

18. The method according to claim 12, wherein the information associated with the second apparatus includes a public key of the second apparatus.

19. The method according to claim 18, further comprising:
deriving the encryption key from the public key of the second apparatus and a private key of the first apparatus, and causing the first apparatus to participate in the pairing based at least in part on the derived encryption key.

* * * * *